United States Patent [19]

Kubo

[11] Patent Number: 5,531,869

[45] Date of Patent: Jul. 2, 1996

[54] METAL CATALYST CARRIED ON CARRIER MAKING USE OF TOURMALINE AND ITS PRODUCTION

[75] Inventor: Tetsujiro Kubo, Tokyo, Japan

[73] Assignee: Kubo Technical Office, Tokyo, Japan

[21] Appl. No.: 151,261

[22] Filed: Nov. 12, 1993

Related U.S. Application Data

[63] Continuation-in-part of Ser. No. 978,510, Nov. 18, 1992, abandoned, and Ser. No. 105,159, Aug. 12, 1993, abandoned, which is a division of Ser. No. 949,372, Sep. 23, 1992, abandoned, which is a continuation of Ser. No. 660,022, Feb. 25, 1991, abandoned.

[30] Foreign Application Priority Data

Feb. 27, 1990 [JP] Japan .................................. 2-46449
Nov. 18, 1991 [JP] Japan .................................. 3-328312

[51] Int. Cl.⁶ ...................................... B01J 21/00
[52] U.S. Cl. ........................ 502/202; 502/439; 502/240; 502/101; 502/207; 205/43; 205/159
[58] Field of Search ................................ 502/439, 240, 502/101; 204/130

[56] References Cited

U.S. PATENT DOCUMENTS

| | | | |
|---|---|---|---|
| 3,561,599 | 2/1971 | Sheen | 210/198.3 |
| 3,975,257 | 8/1976 | Hulse | 204/150 |
| 4,003,252 | 1/1977 | Dewath | 73/861.27 |
| 4,175,058 | 11/1979 | Imai | 252/455 R |
| 4,207,211 | 6/1980 | Russ et al. | 252/466 J |
| 4,211,672 | 7/1980 | Sometaka et al. | 252/455 R |
| 4,406,793 | 9/1983 | Kruyer | 210/693 |
| 4,904,394 | 2/1990 | Clarke et al. | 210/748 |
| 4,952,321 | 8/1990 | Bradshaw et al. | 210/679 |
| 5,108,618 | 4/1992 | Hirasawa | 210/689 |

OTHER PUBLICATIONS

New Technology Japan, Vol. 18, No. 9, "Legionella Contamination Prevention for Cooling Systems", Dec. 1990.
Solid State Physics, Vol. 24, No. 12, "Interface Activity of Water Given Rise to by Tourmaline",T. Kubo, Dec. 1989.
Nippon Shokuhin Kogyo Gakkaishi, Vol. 38, No. 5, pp. 442–424, 1991.
Flowlet Water Activator, Product Brochure (English translation), publication date Jun. 1989 ("Brochure No.1").
Flowlet Water Activator, Product Brochure (English translation), exact publication date unknown but sometime between Feb. to Jun. 1990 ("Brochure No. 2").
Flowlet Water Activator, Product Brochure (English translation), publication date May 1992 ("Brochure No. 3").

*Primary Examiner*—John Niebling
*Assistant Examiner*—Kishor Mayekar
*Attorney, Agent, or Firm*—Wenderoth, Lind & Ponack

[57] ABSTRACT

A metal catalyst carried on a carrier material is provided, the carrier material being selected from the group consisting of a powder of fine tourmaline crystals possessing polarity and a formed body containing a plurality of fine tourmaline crystals possessing polarity. The catalyst is prepared by immersing the carrier material in an aqueous solution containing at least one metal salt, mixing and stirring the aqueous solution until the at least one metal ion is deposited on poles of the tourmaline crystals of the carrier material, separating the carrier material from the aqueous solution, evaporating off traces of the aqueous solution from the carrier material, and drying the carrier material. The metal catalyst may be prepared by immersing the carrier material in an aqueous solution containing two or more metal ions, wherein the metal ions are deposited on said carrier material in an inverse proportion to the magnitude of the deposition ionization tendencies of the metal ions. During the drying of the carrier material, the carrier material may be solidified in a pellet, honeycomb, film, sheet or fiber form.

16 Claims, 2 Drawing Sheets

METAL CATALYST CARRIED ON CARRIER MAKING USE OF TOURMALINE AND ITS PRODUCTION

This application is a continuation-in-part of now abandoned application Ser. No. 07/978,510 filed Nov. 18, 1992 and now abandoned application Ser. No. 08/105,159 filed Aug. 12, 1993. Furthermore, said later application was a divisional of now abandoned Ser. No. 07/949,372 filed Sep. 23, 1992, which was a continuation of now abandoned application Ser. No. 07/660,022 filed Feb. 25, 1991.

BACKGROUND OF THE INVENTION

1. Field of the Invention

The present invention relates broadly to tourmaline. A first and second aspect of the invention relate to a method of depositing an ionic material using tourmaline crystals to removing metals from a liquid such as water.

A third and fourth aspect of the invention relate to a tourmaline crystal with a deposited metal thereon for supplying metallic ions to a liquid such as water.

A fifth aspect of the present invention relates to catalysts in general and to metal catalysts carried on carriers in particular. More specifically, this aspect of the invention is directed to a metal catalyst carried or deposited on a carrier comprising a fine powder of tourmaline crystals and a method for producing such a metal catalyst.

1. Description of the Related Art

The applicant for the present invention has filed an application on Oct. 3, 1989 (Japanese Patent Application No. 57130/1989) for a patent on an invention, the title of which is "Interfacial Purifying Apparatus Using Tourmaline, Method thereof, and Tourmaline Granular Material". This invention relates to a method, apparatus and application thereof, utilizing a discovery of the inventor that an interfacial active function can be provided for a liquid such as water by the reaction of electrodes, that is, between the permanent electrodes contained in tourmaline and liquid molecules of water, etc., to produce a purified liquid, such as water or the like.

Traditionally, where metallic ions have been contained in water, there have been requirements for removing the heavy metal ions which are harmful to life and the metallic ions, such as iron, manganese, etc., which produce adverse effects when the water is used. There have been proposed various kinds of methods and apparatus for this purpose. The fundamental technique, however, is that solid particles of metallic oxide and other compounds are produced in a solution using oxygen, chlorine, ozone, etc., and that these particles are separated for removal by means of sedimentation and filtration.

With respect to the methods and apparatus for removing the metallic ions themselves, there have been known a method and apparatus using zeolite and a method using ion exchange resin. These methods and apparatus, however, have a disadvantage that the reduced adsorptivity and the deteriorated ion exchange resin cause considerable problems. Therefore, an aeration process using oxygen in the air is a more widely employed method.

Even with the aeration method, there are many instances in practice that before the oxidation has been completed, the treatment proceeds to the next step where the separation is performed and that the solid particles produced by the oxidation are too fine to be sufficiently separated.

There are many reasons why these problems have been caused, but the principal reason is that the speeds of the oxidizing reaction and the resulting aggregation are not fast, requiring a certain period of time for the oxidation to complete its reaction. This slow reaction has been the greatest barrier for the prior art to overcome.

In respect to the first, second and third aspects of the invention, the methods and apparatus described above constitute their prior art. The prior art regarding the fourth aspect of the invention will subsequently be described.

As one of the typical examples of this prior art, there are a method and apparatus for dispersing an aqueous solution of copper sulfate to remove algae that has grown in a pond, lake, pool, cooling tower etc. by its eradication. It is known that algae become almost eradicated by copper ion of extremely low concentration such as 5 ppb (1/1,000 of ppm). However, the dispersion of copper sulfate is not suited for uniformally producing such an extremely low concentration as this. It is difficult to dissolve copper ions widely in a large quantity of water only by dispersion. There is locally produced a high concentration of copper sulfate where sulfate ion becomes as concentrated as copper ion. This sulfate ion is harmful to life such as fish or people swimming in the pool. The supply of copper ions to water cannot be sustained, either. Of metallic salts, a water-soluble salt is employed (irrespective of whether it is easy to be dissolved of not), but only a metallic ion is needed for the eradication of algae and the object an ion which is produced simultaneously should be a harmless one.

The prior art regarding the fifth aspect of the invention will subsequently be described.

Catalysts have been used in the chemical industry since the beginning of the 19th century. The discovery of catalysts is tantamount to the birth of the chemical industry. The discovery of new catalysts has especially influenced the development of the petrochemical industry since its origin in about 1960.

A variety of catalysts have been well-known in the art. Among them, there are metal catalysts, most of which are obtained by vapor-depositing catalytic metal components on the surfaces of powders of metal oxides such as alumina ($Al_2O_3$). These catalysts are called "catalysts-on-carriers." Practically, they are pelletized for use.

A catalyst is essentially a substance having the following properties:

1) It increases the rates of chemical reactions.
2) It undergoes in itself no permanent change before and after reactions.
3) It produces an effect in minute amounts.
4) It has no action on thermodynamically unfeasible reactions.
5) It does not alter the equilibrium points of reversible reactions, but accelerates the reactions in the forward and reverse directions.

The catalyst substance may be present in various phases, typically, gas, liquid and solid phases. Reactions whose products are in phase with catalysts are referred to as homogeneous catalytic reactions, and reactions whose products are out of phase with catalysts are referred to as heterogeneous catalytic reactions.

The catalysts, which are referred to in the present disclosure, are present in a solid state, including metal, metal oxide and solid acid (e.g., $SiO_2$, $Al_2O_3$ or zeolite) catalysts. In particular, this invention is directed to the type of metal catalysts-on-carriers most commonly used as catalysts.

When present in wire or planar forms, the metals are so limited in surface area that they cannot efficiently serve as catalysts. Fine metal powders are often awkward to handle, and are sintered at high temperature (200° C. or higher), resulting in surface area reductions.

To solve these problems, metal catalysts-on-carriers are presently produced by dispersing and depositing catalytic metal components throughout and on thermally and chemically stable metal oxides. As is well-known in the art, even the same metal catalyst may vary in terms of its surface properties depending on the properties of the carrier or how it is made, i.e. the so-called "carrier effect".

For instance, alumina ($Al_2O_3$) and/or silica ($SiO_2$) and/or magnesia ($MgO_2$) are used as carriers. This is because these substances are solid acid substances and so have the carrier effect. Besides, NiO, ZnO and other semiconductor metal oxides as well as metal sulfides such as $WS_2$ are used as catalysts. Presently available catalysts are generally classified as shown in Table 1.

exhaust gas into the atmosphere, giving rise to a variety of pollution problems on a global scale such as photochemical smog and acid rain. In addition, a serious problem is arising in connection with petroleum resources. In order to solve these energy- and resource-related problems, there is thus an urgent demand for developing highly active and selective catalysts.

Since many metals serving as catalysts are expensive, there is a cost-effective problem as well.

Catalysts formed by electrodes themselves, on the other hand, are not catalysts in the true sense of the word, because electric energy has to be externally supplied thereto or, in other words, the overall mechanisms of the electrode reactions involve energy consumption.

1. Problems To Be Solved By The Invention

As a result, the above-mentioned interfacial purifying method and apparatus using tourmaline and tourmaline

TABLE 1

| Types | Typical Examples | Examples of Reactions | |
|---|---|---|---|
| Metal | Fe,Ni,Pd Pt,Ag,Co, W,Re, Ge,Ir, | 1) Hydrogentation | $CH_2=CH \xrightarrow{H_2} CH_3CH$ |
| | | 2) Dehydrogentation | $C_6H_{12} \xrightarrow{H_2} C_6H_6 + 3H_2$ |
| | | 3) Creacking by Hydrogeneration | $C_3H_8 \longrightarrow CH_4, C_2H_6$ |
| | | 4) Oxidation | $CH_2=CH_2 \xrightarrow[Ag]{O_2} H_2C-CH_2 \backslash O /$ |
| Seconductor Oxides | NiO,ZnO, $MnO_2,TiO_2$ $Cr_2O_3$, | 1) Oxidation | $CO + O_2 \longrightarrow CO_2$ |
| | | 2) Dehydrogenation | $CH_3CH_2OH \longrightarrow CH_3CHO + H_2$ |
| and Sulfides | $Bi_2O_3$, $.MoO_3$ $WS_2$ NisMoS Cos, | 3) Desulfurization | $H_2S \longrightarrow H_2 + S$ |
| | | 4) Hydrogenation | $CH_2=CH_2 \xrightarrow{H_2} CH_3CH_3$ |
| Insulators | $AL_2O_3$ $SiO_2,MgO$ | 1) Dehydration | $CH_3=CH_2OH \longrightarrow CH_2=CH_2 + H_2O$ |
| Acids | $H_3PO_4$ $SiO_2-Al_2O_3$ (Cyrstalline, Amorphous) $Al_2O_3$ $SiO_2$ zeolite | 1) Polymerization | $CH_2=CH_2 \longrightarrow (-CH_2-CH_2-)$ |
| | | 2) Isomerization | $CH_3-CH=CH-CH_3 \longrightarrow CH_3CH_2-CH=CH_2$ |
| | | 3) Cracking by Hydrogenation | $C_6H_{12} \xrightarrow{H_2} CH_4, C_2H_6, \ldots$ |
| | | 4) Alkylation | $C_6H_6 + CH_2=CH_2 \longrightarrow C_6H_5C_2H_6$ |

Catalysts are available in an electrode form as well, to which electrical energy must be supplied externally.

Petrochemical plants, the use of various fuels produced there, and automobiles spew pollutant gases inclusive of car granular material were invented. This invention, however, did not, as its own objective, provide for the removal of metallic ions in a liquid or of charged fine particles in a liquid and for the supply of metallic ions to a liquid. Thus, aside from the above-mentioned invention, there has arisen a request for an invention such as given below.

In other words, to each of the tourmaline electrodes, fine particles having charges of the opposite character thereto are attracted and are electrically neutralized, thus being deposited and adhesively aggregated. Also, in the case of metallic ions, etc. in a liquid such as water, a metallic coating is produced to be deposited on the electrodes. Further, the metallic coating thus produced is in close contact with the negative pole of the electrode for a metallic ion having a positive charge, so that its resolution in a liquid such as water is restricted. This represents a character different from a metal which can usually be deposited electrically for plating and others.

From these points of view, there has been demand for the further development of the invention for many more utilizations and usages.

In other words, the desired aspects of the invention, which utilize the permanent tourmaline electrodes, are roughly divided into the two types described below.

A first aspect for the invention is that a charged substance such as an ionic substance, etc., contained in a liquid such as water is attracted to each of the tourmaline electrodes having a charge of the opposite character to the charged substance, and is neutralized and deposited on the electrode surface, or in the case of metallic ions in a liquid such as water, a metallic coating is produced on the electrode surface, i.e., so-called deposition and fixation. Utilizing these two properties, the invention provides for the purification of water, etc. as its object.

Then, a second aspect of the invention aims at utilizing for many usages the deposition and fixation of metal on each surface of the tourmaline electrodes together with the tourmaline itself having such metal therewith.

With these two points in view, the aspects of the invention such as described below have specifically been requested.

A. At first, an invention is desired, which can be employed for the eradication of algae and for pasteurization.

It is well known that copper ion is effectively used to remove algae grown in a lake, pond, water tank, etc. Traditionally the spreading of copper sulfate solution has been conducted. However, this method is harmful to life such as fish because sulfate ion is mixed with copper sulfate at the same time. It is also difficult to maintain a sustainable and uniform density of metallic ions, etc. with this method.

Meanwhile, the pasteurizing effect of silver ion is also well known. Metallic silver is insoluble in a liquid such as water, and a silver compound which is also highly insoluble such as $Ag(OH)_2$, etc. is produced on the surface of the metallic silver in a solution. Then silver is produced when this compound is further dissociated in a liquid such as water. It is known that the concentration of silver ion required for pasteurization is several ppb (5–10 ppb).

It should also be taken into consideration that a continuous intake of silver for long years results in a harmful deposition and accumulation in the inner tissues and organs of a human body. According to reliable publications on medical science, deposits of silver are observed in the cerebrum and other organs as a result of experiments using laboratory animals, and neuropathy and other unfavorable symptoms are reported. The relationship between an organism and silver will be understood much clearer in future, but the presence of silver and other metallic ions in drinking water which are ingested daily must be avoided because it may take several decades before the harm caused by its accumulation is understood.

B. Next is an invention on the application of tourmaline as a metal-carrier catalyst.

Many metals have already been used as catalysts, particularly metallic compounds including metallic oxide. Of its catalytic functions, oxiding reaction, reducing reaction, acid-base reaction, etc. are known. Also, the catalytic functions cover wide areas of vapor phase and liquid phase. These metallic catalysts are often used as a metal-carrier catalyst having metal deposited on the carrier surface. The catalyst thus produced is stronger than a metal and metallic compound individually, and not only can the active area be widened but its use, collection, and regeneration are easier. A carrier such as this should have a good adhesion to a metallic catalyst. Also, it should withstand a burning temperature for activation (700°–800° C. in a higher range) and severe conditions for use, such as a higher temperature, atmosphere and acid or alkali, etc.

C. Then, an invention is necessary for the application of controlling metallic ion in a liquid such as water to be used for agricultural, fishery, and biological industries.

In this respect, utilizing highly advanced artificial controlling techniques, there have been developed new agricultural, fishery, and biological technologies in recent years. In this case, a liquid such as water plays also an important role in supplying required components (nutrients). In a technology such as this, any harmful metallic ion or any excessive amount of metallic ion must be removed. Also, certain ions must be supplied or supplemented. If the amount of ion present is too great, it will become harmful to life or if the amount is not sufficient, it will result in a famine state. Further no harmful anion must be supplied with the metallic ion at the same time.

It is therefore necessary to control the supply or removal of the metallic ions.

D. There have been proposed in water treatment techniques various methods of removing heavy metals or heavy-metal ions contained in service water or waste water. In the present invention, the cathode (negative pole) in tourmaline is utilized for effectively and rapidly removing the metallic ion having a charge of the opposite character thereto.

For a metal which is not in an ionic state, the present invention is also applicable after it has been dissolved into the state of a metallic ion by use of an acid, etc. Particularly, this method is intended for the use in removing radioactive metals in the waste fluid discharged from atomic energy facilities, which has become a great concern in society today, and for fixing them permanently for storage.

A primary object of this invention is to provide a solution to the above-mentioned problems.

SUMMARY OF THE INVENTION

A method of depositing an ionic material using tourmaline crystals and tourmaline crystals with a deposited metal according to the present invention utilize a depositing phenomenon whereby, to the cathode (negative pole) of tourmaline permanent electrodes, the metallic ion which is an anion having an electric charge of the opposite character thereto is attracted, neutralized, and deposited as a metallic atom to form a metallic coating on the electrode surface.

Hereinafter a method of depositing an ionic material using tourmaline crystals and the specific structure of the tourmaline crystals with deposited metal according to the present invention will be described in detail.

1. Means to Solve Problems of the Prior Art Concerning the First, Second, Third and Fourth Aspects of the Invention At first, the method of depositing using tourmaline crystals according to the first aspect of the invention is described. In the first aspect, a solidified compound comprising fine tourmaline crystals electrically insulated therebetween with electric insulators is immersed in water or a water soluble, etc. containing electrically charged material such as an ion, etc.

Then, the electrically charged material contained in such liquid is attracted to each of the tourmaline electrodes having an electric charge of opposite character to the electrically charged material. Thus the electrically charged material contained in the liquid is removed by neutralizing, discharging, and depositing the electric charge on the electrode surface and further by fixation.

Next, the method of depositing the ionic material using tourmaline crystals according to the second aspect is described. In the present invention, fine tourmaline crystals are first immersed in a liquid such as water containing an electrically charged material such as an ionic material, etc. Then the electrically charged material contained in the liquid is attracted to each of the tourmaline electrodes having an electric charge of opposite character to the electrically charged material.

Thus the electrically charged material contained in the liquid is removed by neutralizing, discharging, the depositing the electric charge on the electrode surface and further by fixation.

Next, the structure of the tourmaline crystals with deposited metal according to the third aspect is described. In the present invention, there is provided first a solidified compound comprising fine tourmaline particles electrically insulated therebetween with electric insulators, and then a metallic coating. This metallic coating is produced by attracting, discharging, depositing and fixing to the above-mentioned electrodes of the tourmaline crystal an electrically charged material such as an ionic material having the opposite character thereto from a liquid such as water.

Finally, the structure of the tourmaline crystals with deposited metal according to the fourth aspect is described. In the present invention, there is first provided fine tourmaline crystal and then a metallic coating. This metallic coating is produced by attracting, discharging, depositing and fixing to the above-mentioned electrodes of the tourmaline crystal an electrically charged material such as an ionic material having the opposite character thereto from a liquid such as water.

2. Functions of the First, Second, Third and Fourth Aspects of the Invention A method of depositing the ionic material using tourmaline crystals and tourmaline crystals with the deposited metal according to the present invention are structured as set forth above thereby providing functions given below.

In other words, the depositing phenomenon appearing on the electrode surface (cathode) of the tourmaline crystal is fundamentally the same as the phenomenon appearing in a case of so-called plating. The electrode surface of the tourmaline crystal is a surface composed of an inorganic substance of a complicated composition, and is electrically a dielectric having an extremely high d.c. insulation. It is slightly similar to the oxide electrode employed in electrolysis, etc.

The metallic coating produced by deposition on the electrode surface makes its surface a new electrode face to continue deposition of metallic ions, so that the metallic coating increases in thickness. This metallic coating will cease depositing when the coating reaches a certain thickness. The reason is yet to be ascertained but inferably a metallic compound coating having a high electric insulation is formed on the metallic electrode surface and the covering of this coating should be the cause. This metallic compound is a metallic passive state produced by the combination of metallic atom and anion in a water solution such a $OH^-$, $CO^-$, etc., and it is not easily soluble in water.

As described hereinabove, most metals used for plating technique and others can be deposited on the permanent electrodes contained in the tourmaline crystal. The major difference between this deposited metal and the metal produced by so-called plating is that the former is always in contact integrally with the permanent electrode surface even after deposition. This metallic coating is not only intensively fixed to the electrode surface but is influenced by the potential of the electrode which controls the metal not to become metallic ion soluble in a water solution, for example. Also, various chemical reactions appearing on the surface of the metallic coating are brought about by this influence of the electrode.

3. Means for Solving the Problems of the Prior Art and Functions of the Fifth Aspect of the Invention According to the fifth aspect of the present invention, a powderized tourmaline in the form of fine crystals or a molded or otherwise formed body containing fine tourmaline crystals are placed as a carrier material in an aqueous solution of a metal salt, followed by mixing and stirring of the solution to achieve a deposition of the metal on the carrier material. Then, the carrier material is separated from the aqueous solution and dried to evaporate off traces of the aqueous solution, thereby forming a metal catalyst carried on the carrier. The thus carried metal has a surface area so large that its amount can be reduced, and it is stable to heat as well.

There is provided a metal catalyst carried on a carrier making use of tourmaline, which is obtained by placing a powderized tourmaline in the form of fine crystals or a formed body containing fine tourmaline crystals (hereinafter also referred to as the tourmaline carrier material) as the carrier material in an aqueous solution of at least one metal salt, mixing and stirring the aqueous solution to deposit the metal on the carrier material, separating the carrier material from the aqueous solution, evaporating off traces of the aqueous solution from the carrier material, and drying the carrier material. This carrier material itself can serve as a metal catalyst.

Preferably, the aqueous solution contains two or more metal salts, and the metals are deposited on the tourmaline carrier material in an inverse proportion to the magnitude of the deposition ionization tendency of the metals. The resulting metal catalyst allows the individual metals to have their individual catalytic functions, which may often produce a synergistic effect.

Preferably, when drying the tourmaline carrier material with the metal deposited thereon, it is solidified in pellet, honeycomb, film, sheet or fiber forms which are determined depending upon the purpose of the metal catalyst. The resulting metal catalyst may be used in various applications.

Thus, another aspect of this invention is a metal catalyst carried on a carrier making use of tourmaline which is obtained by placing a powderized tourmaline in the form of fine crystals or a formed body containing fine tourmaline crystals as the carrier material in an aqueous solution of two or more metal salts, mixing and stirring the aqueous solution to deposited the metals on the carrier material, separating the carrier material from the aqueous solution, evaporating off traces of the aqueous solution from the carrier material, and drying the carrier material, and wherein when drying the carrier material with the metals deposited thereon, the carrier material is solidified in pellet, honeycomb, film, sheet or fiber forms which are determined depending upon the purpose of the metal catalyst, and the metals are deposited on the tourmaline carrier material in an inverse proportion to the magnitude of electrodeposition ionization tendencies of the metals. The resulting metal catalyst may be used in various applications, and allows the individual metals to have their individual catalytic functions which may often produce a synergistic effect.

According to the third aspect of this metal catalyst invention, there is provided a process for preparing the metal catalyst according to the first aspect of this invention, which comprises the steps of placing powderized tourmaline crystals or a formed body containing fine tourmaline crystals as the carrier material in an aqueous solution of at least one metal salt, mixing and stirring the aqueous solution to electrodeposit the metal on the carrier material, separating the carrier material from the aqueous solution, evaporating off traces of the aqueous solution from the carrier material, and drying the carrier material. This carrier material itself can serve as a metal catalyst.

Preferably, the aqueous solution contains two or more metal salts, and the metal salts are electrodeposited on the carrier material in an inverse proportion to the magnitude of electrodeposition ionization tendency of the metals. The resulting metal catalyst allows the individual metals to have their individual catalytic functions, which may often produce a synergistic effect.

Preferably, when drying the carrier material with the metal electrdeposited thereon, it is solidified in pellet, honeycomb, film, sheet or fiber forms which are determined depending upon the purpose of the metal catalyst. The resulting metal catalyst may be used in various applications.

According to the fourth aspect of the metal catalyst invention, there is provided a process for preparing the metal catalyst according to the second aspect of this invention, which comprises the steps of placing powderized tourmaline crystals or a formed body containing tourmaline crystals as the carrier material in an aqueous solution of two or more metal salts, mixing and stirring the aqueous solution to deposit the metals on the carrier material, separating the carrier material from the aqueous solution, evaporating off traces of the aqueous solution from the carrier material, and drying the carrier material, and wherein when drying the carrier material with the metal deposited thereon, the carrier material is solidified in pellet, honeycomb, film, sheet or fiber forms which are determined depending upon the purpose of the metal catalyst, and the metals are deposited on the tourmaline carrier material in an inverse proportion to the magnitude of deposition ionization tendencies of the metals. The resulting metal catalyst may be used in various applications, and allows the individual metals to have their individual catalytic functions which may often produce a synergistic effect.

BRIEF DESCRIPTION OF THE DRAWINGS

The present invention will now be explained more specifically with reference to the accompanying drawings, in which.

DETAILED EXPLANATION OF THE INVENTION

Jacques and Pierre brothers in 1880 were the first to discover that tourmaline crystal shows electrification phenomena of piezoelectricity and pyroelectricity. In Japan, there is also a record showing that a stone, which attracts a piece of paper when rubbed, was discovered 200 years ago and that such stone was named the "denki ishi" or "electric stone".

There was an attempt to use this denki ishi or electric stone as a pressure sensor or an infrared sensor but crystal and ceramic material having similar electric charges, which were discovered later, have ben used more widely. Consequently while the denki ishi or electric stone remains as a precious stone due to the beautiful brightness of its crystal, it has no other uses than as an ore specimen at present.

The denki ishi or electric stone is called "tourmaline" outside Japan, and among the Japanese gem dealers, it is called "torumarin". In the geological and mineral societies, it is called denki ishi in Japanese or tourmaline in English. Tourmaline is a silicate mineral containing boric acid and belongs to the hemimorphic reflective form having three or six sides. This hemimorphic form is asymmetric vertically. The chemical formula is complicated. A typical formula thereof is given below.

$$3\{NaX_3Al_6(BO_3)_3Si_6O_{16}(OH_9F)_4\}$$

X=Mg, Fe, Li, etc.

The tourmaline crystals show various colors such as red, green, blue, black, etc. according to the kind of sign X (metallic element), and a single crystal may also show various colors in some case. Its specific gravity is 3.1–3.2. Its hardness is 7.0–7.5 by Morse scale, and it is slightly harder than quartz.

The fact that the tourmaline crystal shows piezoelectricity and pyroelectricity has already been described, but as results of several experiments, it was discovered by the inventor of the present application that unlike the electrification phenomena of static electricity, the tourmaline crystal has permanent electrodes at both ends thereof. Based on this new discovery, many important applications and usages have been developed. The intensity of the permanent electrodes contained in the tourmaline is extremely small as compared with the permanent magnetic pole of a permanent magnet. This weakness is probably one of the reasons why it was no earlier discovered.

It is possible to extremely shorten the distance between two tourmaline electrodes by pulverizing the tourmaline crystal to produce fine crystals of several microns or less each. The intensity of the electric field generated between the electrodes is almost inversely proportional to the square of the distance between the electrodes. Hence the intensity of the electric field can be adjusted suitably for a desired use by making the crystals appropriately fine. Also, the number of microelectrodes in the unit space and face can be made extremely great in proportion to the number of crystals.

There has been no proper name to call such material as the tourmaline which contains permanent electrodes equivalent to the permanent magnet in magnetism. In English the term "permanent electlet" may correspond to the term "permanent magnet". In Japanese, the term "eikyu denseki" or "permanent electric stone" should be equivalent to the term "eikyu jishaku" or "permanent magnet". There have been no materials found other than the tourmaline, which contain permanent electrodes. However, in view of the fact that many products and applications have been developed since the permanent magnet was discovered, it is expected that many products and applications will be studied likewise and put into practice in due course of time following this discovery.

The inventor of the present application experimentally discovered earlier that an isolated $OH^-$ ion (hydroxylion) which does not contain any object cation is produced by reaction between the permanent electrodes of fine tourmaline crystals and water molecules and that this hydroxylion produces, though weak, a "material showing an interfacial activation" when it is combined with $H_2O$ molecule. Thus, the application for such invention was filed on Oct. 3, 1989 (Japanese Patent Application No. 257130/1989).

Therefore, here in the present application, the application of so-called deposition phenomenon will be described because this phenomenon has already been described earlier, i.e. utilizing further the permanent electrodes contained in the tourmaline, various metallic ions, etc. which are cation having charges of the opposite character are attracted to the cathode (negative pole) of the permanent electrodes contained in the tourmaline, and are electrically discharged, neutralized, and deposited as metallic atom to form a metallic coating on the electrode surface.

As described earlier, the deposition phenomenon on the electrode surface of the tourmaline crystal is the same phenomenon as so-called plating. The electrode face of the tourmaline crystal is a crystalline surface of an inorganic material having a complicated composition. The tourmaline crystal is electrically a dielectric having an extremely high d.c. insulation. It is similar to the oxide electrodes used for electrolysis, etc.

Such deposition phenomenon as this of metallic ion varies according to various conditions such as the conductivity of the metal, the discharging phase of the metallic ion, the speed of diffusion and movement in a solution, PH of the solution, agitation, etc. The respective lattice constants of the cathode tourmaline electrode surface and the metal deposited thereon differ greatly from each other. Thus, in order to provide an excellent adhesiveness for the metallic coating produced on the electrode surface by the deposition, it may also be necessary to relax the matching degree of the depositing face by the treatment in a solution having a low metallic ion density.

Besides, in order to increase the deposition efficiency, the various methods given below, which are already in use for plating techniques, can be utilized.

(1) liquid agitation; (2) temperature; (3) metallic ion density; (4) PH; (5) additives; and (6) electrode surface cleaning, etc.

As set forth above, most metals which are employed in "plating technique", etc. can electrically be deposited on the permanent electrode contained in the tourmaline crystal. The difference between this deposited metal and the one produced by so-called plating is that the former is always integrated with the electrode surface called permanent electrode after having been deposited thereon. This metallic coating is not only intensively fixed to the electrode surface but is under the influence of potential to control metal not to be dissolved in a water solution as metallic ion. Also, various chemical reactions appearing on the surface of this metal coating are produced under the influence of this electrode.

Here the application of the deposition of metallic ion on the permanent electrode contained in tourmaline crystal will be described.

A. The utilizations of the deposition of metallic ion, etc. on the permanent electrode of the tourmaline.

a) With the deposition and fixation of metallic ion of heavy metal, etc. contained in service waste or waste water on the tourmaline crystal electrode, it is possible to remove these metallic ions from liquid such as water. The metal electrically deposited and fixed is easily soluble by strong acid and is reusable.

b) Solid metal and metallic colloidal particles contained in a liquid such as water are once dissolved by use of acid, etc. and are converted into metallic ion. Subsequently, with the method described in the preceding paragraph a), this metallic ion is deposited and fixed, and is removed from a liquid such as water.

c) Radioactive metal contained in a waste liquid used for atomic power generation is deposited by methods such as described in the proceeding paragraphs a) and b), etc. for fixation, condensation and separation.

d) With the same method as described in the proceeding paragraph c), a metal having a specific radioactivity such as radioactive cobalt, etc. can be deposited and fixed on the tourmaline crystal electrode. This can be utilized in the medical field.

B. The utilization of tourmaline with deposited metals as a metal carrier.

a) The utilization of tourmaline with deposited copper is first described in respect to the algae extinction.

It is well known that copper ion is effectively applicable to preventing algae from being grown in a lake, pond, water tank, etc., or to remove them therefrom once grown. Traditionally, spreading, etc. of copper sulfate solution has been performed for the purpose. This method, however, is harmful to life such as fish because sulfate ion is mixed at the same time in addition to copper sulfate. The concentration of copper ion required for the algae eradication is only several ppb (ppb is 1/1,000,000,000).

The metallic copper deposited on the cathode tourmaline electrode produces basic carbonic copper—$CuCO_3.Cu(OH)_2$—on its surface. This substance is extremely stable and is insoluble in water. However, it is slightly soluble in water containing carbonic acid. The solubility is approximately 0.003 gr/100 gr as a concentration of basic carbonic copper.

This concentration is as high as 100–1,000 times the concentration of copper ion needed to cause algae to be destroyed, which is as low as several ppb. The potential on the cathode tourmaline electrode controls the metallic copper Cu not to be dissolved into water by allowing it to become $Cu^{++}$ ion having positive charge, thus making the basic carbonic copper on the electrode surface more insoluble. This means that any useless solution of copper ion can be prevented appropriately when it is used for the algae prevention. Also, substances, which are produced at the same time that this basic carbonic copper is dissolved, are carbonic ion, oxygen, and hydrogen, and no substance harmful to life is produced.

b) Next, the utilization of tourmaline with deposited silver for pasteurization is described.

It is well known that silver ion is effective for pasteurization. A familiar example is silver-added active carbon is used for a home water purifier, etc. Metallic silver is insoluble in water. However, it produces insoluble silver compound in water, such as $Ag(OH)_2$, etc. This compound is further separated and dissolved in water to produce silver ion. The concentration of silver ion needed for the algae prevention is made public as several ppb (5–10 ppb).

Silver is not a so-called "essential metal" such as iron, copper, zinc, etc. needed for the vial activity of a living body. This is the same as cadmium, mercury, etc., and caution must be exercised with these metals because of the harm caused by the deposition and accumulation of silver in the inner tissues and organs of a human body resulting from its continuous intake for long years. According to reliable publications on medical science, deposition of silver are observed in the cerebrum and other organs as a result of experiments using laboratory animals, and neuropathy and other unfavorable symptoms are reported. The relationship between organism and silver will be understood much clearer in the future, but the presence of silver in drinking water and the presence of other metal ions as well which are taken in daily must be avoided because it may take several decades before the harm caused by its accumulation is understood.

In addition to the above, there are following applications utilizing the pasteurizing effect of silver ion.

1) Cooling tower (used in combination with the algae prevention effect of the copper ion).
2) Pool water (used in combination with chlorine sterilizer. Use of chlorine agent should be minimized. Only silver ion can be employed. In an outdoor pool, it should be used with copper ion to prevent algae from being grown).
3) Shower water, flush toilet water and cleaning water for heated water commode.
4) Bathroom (home and public)
5) Various cleaning water, washing water, and hospital water.
6) Sterilization of discharged water after waste water treatment in various scales, large or small.
7) Sterilization for water treatment for medium scale running water, etc. (may be used in combination with copper ion for the algae prevention).
8) Water for tooth brushing and cleaning mouth, and use for laundry, etc.
9) Use for emergency water tank.
10) Sterilization of drinking water for use in a short period such as traveling, leisure, etc.

In order to deposit silver on tourmaline, most water soluble silver compounds can be utilized. While a typical example is silver nitrate used for silver platings, waste liquids obtainable from other silver plating and photographic industry can also be utilized. The potential on the tourmaline electrode surface controls the silver solution, and no harmful acid, cyanide, etc. are produced when the dissolution occurs in a liquid such as water as in the case of the copper ion described in the preceding paragraph.

c) The utilization as a supply source of the essential metals needed to maintain life (including plants and micro-organism) is described.

All the creatures living on the earth, irrespective of animals, plants or micro-organisms, have functions to absorb, through the transmission of cell membranes of the respective creatures, various ions, chiefly nitric acid, ammonia, phosphoric acid, potassium, sulfuric acid, magnesium, iron, manganese, copper, boron, chlorine molybdenum, and many other elements. These elements thus absorbed become constituents of living body or assume essential parts to perform metabolic functions and are important to maintain life. Several of these metals are called "essential metals" which are essential, though in small quantities, to the maintenance and growth of the living creatures.

In recent years, we have been developing new agricultural, fishery, and biological techniques for our own food productions utilizing the natures such as land, sea, river, etc. and the highly artificial controlling techniques. In this case, a liquid such as water still has an important role to supply essential components (nutriments).

In a technique, such as this, some metallic ions must be removed or some must be supplied. Also, the quantity contained should be appropriate. It becomes harmful, if it is too great or results in a famine state if it is insufficient. Besides, the essential metallic ion must be supplied without any harmful anion at the same time. Such control as this is possible by depositing metallic ion to be fixed on the tourmaline electrode. The metal thus fixed on the electrode is also dissolved as ion gradually in a liquid such as water. These two characteristics are utilized for performing a fine control of the amount of metallic ion in a liquid such as water by combining them appropriately.

d) Next, a metal-carrier catalyst with tourmaline as its carrier is described.

Metals have already been used as catalysts, particularly metallic compounds including metallic oxide. Of its catalytic functions, oxiding reaction, reducing reaction, acid-base reaction, etc. are know. Also, the catalytic functions cover wide areas of vapor phase and liquid phase. These metallic catalysts are often used as metal-carrier catalyst having metal deposited on the carrier surface. The catalyst thus produced is stronger than a metal only, and not only the active area can be widened but its use, collection, and regeneration are easier. A catalyst such as this should have a good adhesion to a metallic catalyst. Also, it should withstand a burning temperature for activation (700°–800° C. in a higher range) and severe conditions for use such as a higher temperature, atmosphere and acid or alkali, etc. Tourmaline has excellent characters as a carrier in this point. The temperature at which its permanent electrode is lost is between 950° and 1,000° C. and it is has a sufficient heat resistivity when it is used at temperatures lower than 900° C. Also, it has a better characteristic than quartz against acid, alkali, etc.

In order to produce a metal-carrier catalyst such as this, water-soluble salts of such metal are used.

A metal-carrier catalyst is produced by burning further the fine crystalline particles of tourmaline with deposited metal obtained or sintered ceramic substance including such particles at a temperature required to obtain catalytic activation. Most transition metals can be used for this purpose. For its shapes, particle, grain, plate, pipe, honeycomb, etc. made of ceramic or glass are all usable, and in the case of temperatures lower than 200° C., plastic can be used as a forming material.

Further, it is possible to use this by mixing with plastic or texture having low heat resistivity or by coating, etc. utilizing a metal-carrier catalyst which has already obtained its catalytic activation by pre-heating. The usages of these catalysts are the same as those of the metal-carrier catalysts and metallic catalysts currently in use.

This fifth aspect of the present invention will now be explained with reference to how a fine tourmaline crystal may act catalytically.

(i) Catalytic Action of A Tourmaline Crystal

Water is electrolyzed between two electrodes, one positive and one negative. At a voltage lower than the electrolytic voltage of water (about 1 V/m), the reaction $H_2O \rightarrow H^+ + OH^-$ takes place, whereby $H^+$ ions are adsorbed on the cathode (negative electrode) with the charges neutralized, generating $H_2$ gas. At higher than the electrolytic voltage, electrolysis of water proceeds so rapidly that $H_2$ and $O_2$ are generated on the cathodic and anodic surfaces.

These electrolytic reactions belong to known chemical reactions, but in order to allow them to take place and proceed, electric energy has to be supplied externally. With the progress of the reactions, electric energy is consumed. Thus, such electrolysis is distinct from a catalytic reaction, even if the electrode substance is not consumed.

Reference will now be made to electrolysis of water by the permanent electrodes of fine tourmaline crystals. In connection with the mechanisms of these electrodes, some experiments have verified that a fine tourmaline crystal possesses a positive and negative pole or electrode which does not disappear at a normal temperature and pressure. In the case of iron tourmaline, the electrodes disappear when heated at a temperature between about 950° C. and 1000° C.

The electrodes of fine tourmaline crystals electrolyze water. However, no or little generation of $O_2$ takes place, because the voltage is low and so the reaction taking place is limited to $H^2 \leftrightarrows H^{2+} + OH^-$. For this electrolysis, there is no need for an external source of energy. This is because tourmaline crystals have an elastic strain energy inherent in the polar crystals due to the specific conditions of their creation in nature. Note that the term "polar crystals" refer to those in which a positively and negatively charged ionic substance forming crystal lattices remains displaced (distorted) from and fixed at lattice point positions where they should be. Tourmaline crystals are accidentally formed in nature at a specific pressure, temperature and water content and in the presence of other substances, and are considered to have crystal lattices fixed in place which remained distorted. Distortion of the crystal lattices formed by such an ionic substance takes place in a certain direction along the crystal axes, letting it assume the property of a permanent electrode.

Referring to the mechanism, electrons bearing negative charges are carried from the surface corresponding to the anode (positive electrode) toward the c-axis of the crystal. Then, the thus carried electrons are successively stored on the end portion of the crystal corresponding to the cathode (negative electrode). However, the electrons bearing negative charges repel each other, increasing the electron density on the cathode but producing no potential difference between it and the anode.

Between the opposite ends of the c-axis of a tourmaline crystal there is formed a field across which electrons are transported. This field is formed by distortion of the lattice points of tourmaline that is an ionic crystal, and this distortion does not disappear at a normal temperature and pressure, nor does the phenomenon of transporting electrons disappear. This illustrates the property of a permanent electrode.

Here, the definition of a catalyst is again summarized.

(1) It promotes the rates of chemical reactions.

(2) The accelerated reactions are thermodynamically feasible in themselves.

(3) It undergoes no change before and after reactions.

(4) It is used in small amounts.

In the light of this definition of a catalyst, now consider electrolysis of water by the fine electrodes of tourmaline crystals. Even in the absence of a voltage, water is separated into $H^+$ and $OH^-$, although not noticeably. Electrolysis of water by tourmaline accelerates this reaction. Hence, there is no need for an external source of energy. This function of tourmaline does not attenuate. Tourmaline crystal powders are thus said to have a catalytic function.

For electrolysis of water, the voltage required to separate 70% of water into $H_2$ and $O_2$ is at most 15 V, but it is known that heat energy as large as at least 2000° C. is needed for electrolysis by heating. This supports the conclusion that these electrolytic reactions with no energy consumption are catalytic reactions.

(ii) Carrier Material for Metal Catalyst

Referring first to tourmaline, it occurs in nature in two forms. One form of tourmaline is a large, discrete crystal. This is easily separable from quarts, feldspar and other crystals by crushing. The obtained tourmaline crystal contains less impurities or, in other words, has a purity of 90% or more. Another form of tourmaline is finely dispersed through the ground (mainly in granite) which per se consists of fine crystals. In this case, the tourmaline content lies in the range of 3–10%. Both types of tourmaline may be used as a metal catalyst carrier material. In this invention, powders of these tourmaline crystals or igneous rocks containing them obtained by pulverization (hereinafter also called a tourmaline powder) are used as a carrier material either by itself or preferably in a formed body.

In the past, crystalline alumina, crystalline alumina-silica, amorphous alumina-silica, zeolite, asbestos, diatomaceous earth and so on have been used as metal catalyst carriers. In view of these metal catalyst carriers, the properties they have and how they are prepared are important as well, because the catalytic activities of metals adsorbed on the surfaces of the carriers are increased by their chemical or physical adsorptivities.

Tourmaline is a silicate mineral containing boron, and belongs to a trigonal or hexagonal, hemimorphic, hemihederal group. Its hemimorphism is asymmetric with respect to the major axis, and its chemical formulae are complicated. Set out below is one typical chemical formula.

$$3\{NaX_3Al_6(BO_3)_3Si_6O_{16}(OH\ F)_4\}$$

wherein X=Mg, Fe, Li, etc.

Tourmaline has a specific gravity of 3.1 to 3.2 and a Mohs hardness of 7.0 to 7.5, indicating that it is slightly harder than quartz. In an aqueous solution of a metal ion containing electrolyte, the cathode (negative electrode) of tourmaline crystals adsorb many metal ions, esp. ions of heavy metals having a small ionization tendency, which are cations with an opposite polarity, so that the metal ions are electrically neutralized and allowed to precipitate as metal atoms forming a metal film on the surface of this electrode. This process is called the deposition phenomenon. The electrode surfaces of tourmaline crystals are those formed of inorganic materials of complicated compositions, and so provide dielectric surfaces which are electrically highly insulating with respect to direct currents.

The metal film formed on the surface of the electrode of tourmaline by deposition then provides a fresh electrode surface on which another metal film is to be formed by the subsequent deposition. Thus, the metal film increases in thickness. However, when this metal film reaches a certain thickness, deposition no longer takes place on it. It is presumed that the metal electrode is covered with a metal compound film that is highly insulating. With some special exception, it is required that a metal catalyst be maintained as a metal itself so as to be used as a catalyst. Hence, the metal film deposited should not be too thick; that is, it should not exceed a critical thickness at which some metal compound is formed. Note, however, that this is determined depending upon where and in what conditions the catalysts are used.

As has been described above, nearly all metals used for "plating techniques" can be deposited on the permanent electrodes of tourmaline crystals. This deposition is even much stronger than vapor deposition used in depositing metal catalysts on carriers, and the deposited metal remains integral with the electrode surface after deposition, unlike a metal film made by so-called plating. This metal film is not only firmly fixed to the electrode surface but is also affected by a potential that prevents the metal from being converted into metal ions in, e.g. an aqueous solution. Chemical reactions taking place on this metal surface occur largely under the influence of that electrode.

Thus, the reaction by the permanent electrodes of fine tourmaline crystals is a catalytic reaction in itself, and it makes possible the formation of a hybrid catalyst made up of many materials and having composite actions, by virtue of the metal catalyst deposited on this cathodic surface. Hybridization of such metal catalysts with tourmaline electrodes may be achieved by the following various combinations.

First, tourmaline serving as a carrier material may be used even in powdery forms. Preferably, alumina, silica, alumina-silica, zeolite, amorphous silicate glass or other fibers may be mixed and kneaded with tourmaline powders, and the mixtures may in turn be molded or otherwise formed in honeycomb, pellet or cloth shapes into carriers.

In order to support a plurality of metals on the cathode ends of tourmaline crystals serving as a carrier, they may be deposition on it in the following manners.

First, a plurality of metals may be deposited on the cathode in an inverse proportion to their ionization tendencies to form metal films in layers. The metal films may be controlled by the concentration of the metal ions in the aqueous solution of each metal salt in which the carrier is immersed, the immersing time and temperature, and other factors.

Alternatively, an aqueous solution containing a plurality of metal salts at the predetermined ratios of their metal ions may be prepared, and the carrier of tourmaline may be immersed to make a catalyst in which an alloy-like mixture of plural metals is carried on the carrier.

The concentration of the metal ions in the aqueous solution is decreased by deposition, but this may be compensated for by adding to and dissolving in the aqueous solution a fresh supply of metal salts.

As mentioned above, a water-soluble salt of the metal to be supported on the carrier is added to water to form an aqueous solution thereof, and the carrier material such as a powder of fine tourmaline crystals is added and mixed well under agitation. For instance, when platinum is used as the metal to be deposited, its concentration in the aqueous solution should preferably lie in the range of 0.5% to 5%. After stirring has been conducted well enough, the tourmaline crystals with the metal deposited thereon are obtained by filtration, treated with ordinary procedures such as sedimentation or centrifugation to remove traces of the aqueous solution from them, washed with water and dried. The thus dried tourmaline crystals with the metal deposited thereon are airtightly sealed in a container for storage.

Depending upon the purpose of the catalyst, some other metal salts may simultaneously be dissolved in the water for mixing. The obtained tourmaline crystals with the metals deposited thereon may then be mixed with metal oxides such as alumina ($Al_2O_3$), silica ($SiO_2$) and titanium oxide ($TiO_2$). The mixture is in turn molded or otherwise formed into a solid pellet (which may be in spherical form). In this manner, a pellet type catalyst may be prepared.

Alternatively, a pellet containing fine tourmaline crystals may be brought into contact with an aqueous solution of the same metal salts as mentioned above and stirred well in a fluidized state. Then, the pellet is separated from the aqueous solution, washed with water, dried and airtightly sealed in a container for storage, as mentioned above. In addition, the carrier may be in other forms, e.g., honeycomb, film, sheet or fiber forms which may be determined depending upon the purpose of the catalyst. Thus, the metal catalyst may be prepared from a carrier of the tourmaline crystals themselves or from shaped bodies containing the crystals.

In summary, the present invention provides a metal catalyst supported on a carrier, which is obtained by placing powderized tourmaline crystals or a formed body containing fine tourmaline crystals as the carrier material in an aqueous solution of at least one metal salt, mixing and stirring the aqueous solution to deposit the metal on the carrier material, separating the carrier material from the aqueous solution, evaporating off traces of the aqueous solution from the carrier material, and drying the carrier material.

The aqueous solution may contain two or more metal salts, and the metals may be deposited on the tourmaline carrier material in inverse proportion to the magnitude of their deposition ionization tendencies. Moreover, when drying the carrier material with the metal deposited thereon, it may be solidified in pellet, honeycomb, film, sheet or fiber forms which may be determined depending upon the purpose of the metal catalyst. And the carrier may be in a hybrid form.

In other words, the present invention provides a process for preparing a metal catalyst carried on a carrier making use of tourmaline, which comprises the steps of placing a tourmaline carrier material in an aqueous solution of at least one metal salt, mixing and stirring the aqueous solution to deposit the metal on the carrier material, separating the carrier material from the aqueous solution, evaporating off traces of the aqueous solution from the carrier material, and drying the carrier material.

The aqueous solution may contain two or more metal salts, and the metals may be deposited on the tourmaline carrier material in inverse proportion to the magnitude of their deposition ionization tendencies. Moreover, when drying the carrier material with the metal deposited thereon, it may be solidified in pellet, honeycomb, film, sheet or fiber forms which may be determined depending upon the purpose of the metal catalyst. The carrier may also be in a hybrid form.

Set out below is a preferred composition of the carrier material which is a formed body containing fine tourmaline crystals, e.g. in the shape of a pellet.

(1) Iron tourmaline crystals (Schorl) of 1 to 5 μm (preferably 3 μm)—1 to 15% by weight (preferably 10% by weight);

(2) Alumina of 0.3 to 3 μm (preferably 0.3 μm)—30 to 50% by weight (preferably 40% by weight);

(3) Borosilicate Glass of 1 to 5 μm (preferably 3 μm)—30 to 50% by weight (preferably 40% by weight); and (4) Clay Type Molding Aid (mixed with 20%, preferably 10% of water ) 7 to 15% by weight (preferably 10% by weight).

EXPERIMENTS AND EXAMPLES

The present invention will now be explained more specifically with reference to the following experiments and examples, but the invention is not to be considered limited to these embodiments.

Figure 1:
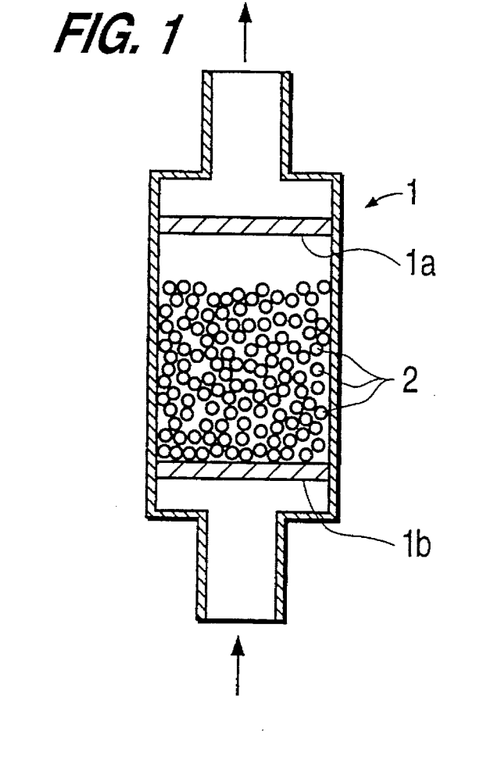
FIG. 1 is a cross-sectional side view showing an embodiment of the aggregate of granules used for in the depositing method using tourmaline crystal according to the present invention.
Figure 2:
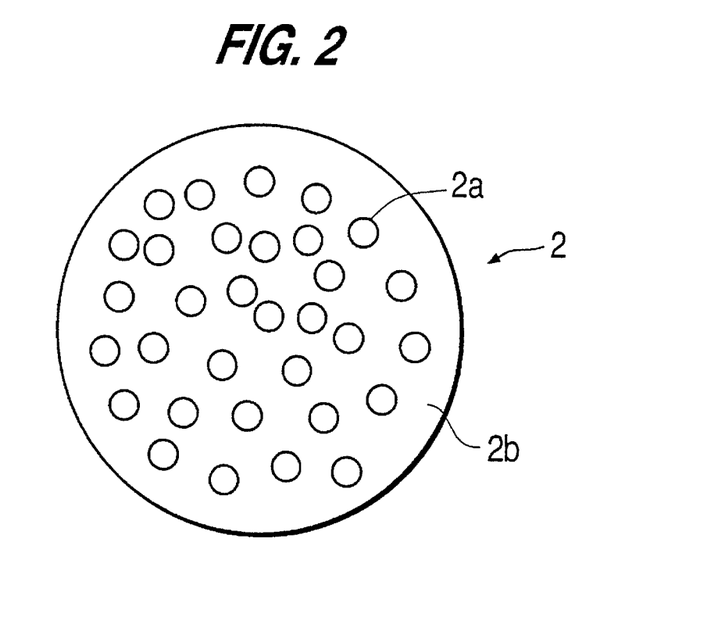
FIG. 2 is an enlarged side view of a granule shown in FIG. 1.

In FIG. 1, a device 1 having a simple structure is shown. On the top and bottom ends thereof, orifices 1a and 1b allowing only water to pass therethrough are provided. Then, the ascending flow of water is passed through a fluidized layer such as this. The invention is based on an anticipated phenomenon to be generated by the water passing through this device 1 and the reaction across the tourmaline electrodes on the surface of tourmaline granules 2. Between fine tourmaline crystals are filled in with ceramic 2b having higher electric insulation to prevent the fine tourmaline crystals 2a on the surface of the tourmaline granules 2 from being placed too close to each other in order not to offset electrodes having opposite characters. FIG. 2 illustrates such state, and desirably the tourmaline electrodes on the surface should be as many as possible. An appropriate quantity of tourmaline contained should be approximately 5–10% of the entire quantity of the granules. Also, the size of the fine crystal used should be several microns.

The tourmaline granules are provided in a manner explained below. Firstly, a tourmaline crystal of the present invention, i.e., a compound chiefly comprising tourmaline crystals as an aggregate of granules will be described in detail according to an embodiment combined with the invention disclosed in the above-mentioned Japanese Patent Application No. 257130/1989 in conjunction with the accompanying drawings.

At first, an igneous rock containing approximately an 8–10% of iron tourmaline is crushed into pieces of approximately 5–10 cm each. Then, by visual selection, the pieces containing more tourmaline are selected for experiment.

A blue solution characteristic of copper ion is prepared by dissolving 2 g of copper sulfate in 1,000 cc of a refined water (deionized water). Then 500 g of the aforesaid crushed stones containing tourmaline are immersed in this solution and left for 24 hours. The blue color characteristic of copper ion then disappears and the solution becomes colorless and transparent. When the solution is further left for three days as it is, the black tourmaline portion on the surface of the crushed pieces is changed into green. The color is so-called verdigris characteristic of basic carbonate $[5H_2O\cdot CuCO_3\cdot Cu(OH)_2]$. This shows that the copper ion in the copper sulfate solution has been deposited on the portion corresponding to the cathode tourmaline electrode (negative pole). There is also a portion where the slime tourmaline is exposed but no such deposition is observed at all. Such portion corresponds to anode (positive pole) having the same charge as the copper ion which is anion.

Subsequently the above-mentioned crashed stones are left for an hour respectively at 900° C., 950° C., 1,000° C., and 1,050° C., and then cooled gradually. Using these four specimens, the same immersing experiment as the aforesaid 1 is conducted. As a result, no changes are observed in colors of copper sulfate solutions in which the specimens of 1,000° C. and 1,050° C. have been immersed. The temperature at which the permanent electrodes are lost is considered to be between 950° and 1,000° C. The experiment, which has indicated the presence of a temperature equivalent to the curie temperature, is repeated for the depositions of several different kinds of metals (such as copper, silver, nickel, etc.), and the measurements are conducted by chemically analyzing each quantity of the deposition. The observation shows that all tourmaline crystals have the permanent electrodes and that there is the presence of a temperature equivalent to the Curie temperature at which the permanent electrodes are lost.

The tourmaline crystals with deposited metals according to the present invention are not limited to an aggregate of granules as shown in the present embodiment as a matter of course but can be used with various other types such as honeycomb, fine crystals, etc.

Subsequently the outlines of experiments for each of the embodiments and the results thereof will be described.

(1) Deposition and elution of copper ion.

I. Experiment on copper ion deposited on cathode tourmaline electrode (negative pole).

1) A water solution of thin blue is prepared by dissolving 2 gr of copper sulfate in 1,000 cc of distilled water.

2) Sintered ceramic balls (powdered granite 45%, alumina 25%, and silica 25%) containing approximately a 4% of fine tourmaline crystals are used. This ball has a diameter of 3.2 mm on the average; specific gravity, approximately 3.0; and brown in color.

In a copper sulfate solution of 1,000 cc prepared as above, 200 gr of the ceramic balls containing tourmaline are immersed, and are continuously agitated respectively for one hour, five hours and 24 hours taking a precaution not to allow the agitator blades to contact the ceramic balls. When the agitation is completed, the ceramic balls are removed, and the amount of copper in the remaining solution is analyzed. The results thereof are stated in Table 2 shown in a later page hereof.

II. Experiment on the elution of copper deposited on the tourmaline electrodes of the ceramic balls.

200 gr of the ceramic balls with the deposited copper which has been produced by the same method as the experiment in the preceding paragraph are immersed in 1,000 cc of distilled water and are continuously agitated in the same manner as in the experiment I mention above. After the agitation for one hour, five hours, and 24 hours, the ceramic balls are removed. Then the amount of copper in the remaining liquid such as water is analytically determined by the normal method. The results thereof are stated in Table 3 shown in a later page hereof.

(2) Deposition and elution of silver ion.

I. Experiment on silver deposited on the cathode (negative pole) of the permanent electrodes of tourmaline.

1) A silver nitrate solution is prepared by dissolving 2 gr of silver nitrate in 1,000 cc of distilled water.

2) 200 gr of the same ceramic balls used for the experiment (2) are immersed in 1,000 cc of silver nitrate solution and are continuously agitated. When the agitation is completed, the quantity of silver in the remaining solution is analytically determined. The results thereof are stated in Table 4 shown in a later page hereof.

II. Experiment on elution of silver deposited on the tourmaline electrodes (cathode) of ceramic balls.

A similar experiment for copper performed in the above-mentioned (2) is conducted. The results thereof are stated in Table 4 shown in a later page hereof.

The deposited amount of silver applied to the ball is 0.48 mg/gr prior to being used for this experiment.

(3) Algae extinction and pasteurization.

I. Algae extinction using ceramic balls with electrodeposited copper.

This experiment is carried out in an actual pond of 2,500 m³ for a period of approximately nine months (shown in Table 8).

II. Experiment on pasteurizing effect.

a) The ceramic balls with deposited silver prepared by the method described in the above-mentioned experiment (2) are weighed respectively for 1 gr and 5 gr and are immersed each in 1,000 cc of water containing bacteria beforehand. Then the agitations are conducted in the same manner as the experiments hitherto undertaken. The results thereof are stated in Table 6 shown in a later page hereof.

A similar experiment is conducted using ceramic balls with deposited copper but no effect is observed at all even for 50 gr/l.

b) A solution is prepared by immersing in 1,000 cc of distilled water 10 gr of ceramic balls with the deposited silver produced by a similar method as in the above-mentioned experiment (2) and by agitating the solution for two hours.

Against a portion of solution containing the above-mentioned silver ion, a water containing bacterial is mixed to make its portions 10 times and 100 times, and the mixtures are agitated for 10 minutes. Then the numbers of bacteria are counted for colon bacillus group and general bacteria. The results are stated in Table 7 shown in a later page hereof.

As the above describes, the results of these experiments can be considered:

1) It is clear that silver and silver ion contained in water solutions of copper and silver soluble salts are deposited on the cathode electrodes of the tourmaline permanent electrodes.

2) This fact verifies that tourmaline contains "permanent electrodes" corresponding to permanent magnets.

3) As a result of the pasteurization experiments using silver ion, it is clear that for obtaining a pasteurizing effect a certain time is required to allow a contact between a density of silver ion and bacteria. For an extremely short time or instantaneously, no sufficient effect can be expected.

4) While the actual test in a pond mentioned above results in a greater success than anticipated, the consumption of deposited copper is not even; a great elution is observes at the beginning, but it becomes small as time elupes and finally it becomes extremely small as given below.

The ceramic balls employed for the above-mentioned actual test in a pond were a prototype product prepared at an early stage, and the quantity of deposited copper was less than a half of those used for the experiments described herein.

The quantity of deposited

| Copper prior to use | 0.06 mg/gr |
| After use in 100 days | 0.04 mg/gr |
| After use in 300 days | 0.039 mg/gr |

For reference, the quantity of deposited copper of the ceramic balls used for several experiments described herein is approximately 0.15 mg/gr and it is approximately 2.5 times the above-mentioned balls employed for the actual test in the pond.

In this respect, the conditions given for the actual test in the pond are as follows:

A. Size of the pond,

| Area | 1,500 m² |
| Average depth | 50–60 cm |
| Total quantity of water approximately 1,000 m³ | |

Living creatures 1,000 colored carps, etc.

The total quantity of water should be replaced by ground water in every three days completely according to the calculation.

B. Operation of circulating filter pump.

Eight-hour operation per day. The total quantity of water is completely circulated for filtration once a day.

C. Water transparency.

By eye-sight, the water is transparent but dead leaves of indeciduous trees, dusts, and dead algae are floating. Therefore, the transparency is reduced to approximately 60 cm as a measured value. The conductivity is 30 μs/cm in January and 33 μs/cm as of March, and the DO and the contamination of water itself does not advance. However, one to two months thereafter, these dusts (dead leaves and dead algae) are flown away by the overflown waste water, and the transparency is restored to almost 80 cm.

D. Period of experiment.

At the end of January, 1989, a flow magnetic water activator using an aggregate of granules of tourmaline crystals with deposited metal as mentioned above was installed in the pump chamber. Then, for approximately eight months to the end of September in 1989, the experiments were carried out through the four reasons, winter, spring, summer, and fall. Three times a month, environmental temperature, water temperature, PH, dissolved oxygen (DO ppm), conductivity (μs/cm), transparency (cm) and the growing condition of algae, etc. are observed by eye-sight, and the average values are listed.

This summer, due to an abnormal water famine, the ground water became abnormal resulting in lowering transparency and DO temporarily (July–August), but no abnormality was observed in the growth of carps in the pond.

E. On Oct. 23, 1989, the operation of the flow magnetic water activator using granules containing tourmaline was terminated, and the experiment was suspended. Then, copper deposited billet (30 kg) was withdrawn from the pond. After that, the conditions of the pond were observed with the results giver below.

| 1. PH | 8.1 · 7.9 |
| 2. DO | 8.4 ppm · 5.6 ppm |
| 3. Transparency | 60 cm · 80 cm |
| 4. Algae started growing again | |
| 10 days later | Approximately 2 cm |
| 20 days later | Approximately 4 cm |
| 30 days later | Approximately 6 cm |

The above results again verified that the effects of the above-mentioned flow magnetic water activator and copper deposited billet. On Dec. 19, 1989, the facilities were restored. All the data are stated in Table 8 shown in a later page hereof.

Figure 3:
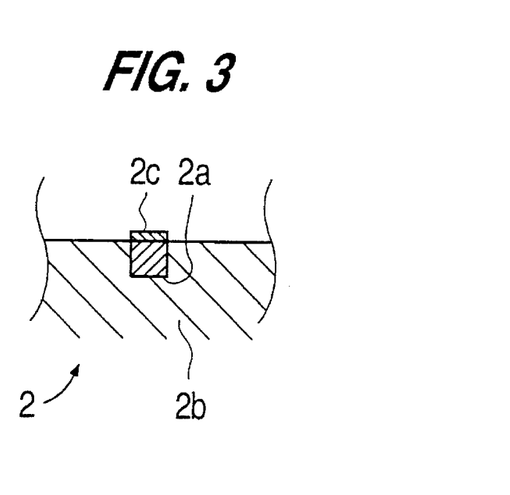
FIG. 3 is a partially cross-sectional side view of the granule shown in FIG. 2.

In this respect, the state of deposited metal 2c is shown in FIG. 3 for further reference.

TABLE 2

| Item No. | Presence of immersed substance | Immersing period | Copper (Cu) in solution | Copper deposition on ceramic ball |
|---|---|---|---|---|
| 1 | No ceramic balls | 0 hour | 512 mg/l | 0 |
| 2 | Immersed | 1 hour | 488 mg/l | 0.12 mg/gr |
| 3 | Immersed | 5 hours | 483 mg/l | 0.145 mg/gr |
| 4 | Immersed | 24 hours | 482 mg/l | 0.15 mg/gr |

TABLE 3

| Item No. | Ceramic balls | Immersing and agitating period | Copper density in solution | Elution of ceramic balls per 1 gr |
|---|---|---|---|---|
| 1 | 200 g/l | 1 hour | 1.25 mg/l | 0.0063 mg/gr |
| 2 | 200 g/l | 5 hours | 1.29 mg/l | 0.00645 mg/gr |
| 3 | 200 g/l | 24 hours | 1.39 mg/l | 0.00675 mg/gr |

TABLE 4

| Item No. | Immersing and agitating period | Ag in solution mg/l | Deposition on ball (calculated value) |
|---|---|---|---|
| 1 | 0 hour | 1280 mg/l | 0 mg/gr |
| 2 | 5 hours | 1200 mg/l | 0.4 mg/gr |
| 3 | 4 hours | 1190 mg/l | 0.45 mg/gr |
| 4 | 8 hours | 1190 mg/l | 0.45 mg/gr |

TABLE 5

| Item No. | Immersing and agitating period | Silver density in solution | Silver elution from ball |
|---|---|---|---|
| 1 | 0 hour | 0 mg/l | 0 mg/l |
| 2 | 2 hours | 8.92 mg/l | 0.0446 mg/gr |
| 3 | 24 hours | 12.0 mg/l | 0.06 mg/gr |

TABLE 5-continued

| Item No. | Immersing and agitating period | Silver density in solution | Silver elution from ball |
|---|---|---|---|

Ceramic ball with silver deposition is used)

TABLE 6

| Item No. | Left period | Number of general bacteria balls 1 gr/l | Number of general bacteria balls 5 gr/l |
|---|---|---|---|
| 1 | Prior to test | 3400 | 3400 |
| 2 | Immediately after immersion of balls | 2800 | 160 |
| 3 | 2 hours | 14 | 0 |
| 4 | 5 hours | 10 | 0 |

TABLE 7

| No. | Mixing ratio | Colon bacillus group | General bacteria | Remarks |
|---|---|---|---|---|
| 1 | Blank | 264 | $7 \times 10^3$ | |
| 2 | 10:1 | ~ | $17 \times 10^2$ | |
| 3 | 100:1 | 189 | $7 \times 10^3$ | No difference from Blank |

(Ceramic ball with silver deposition is used)

TABLE 8

| Date | Atmospheric temperature | Water temperature | PH | DO ppm | Conductive ratio μS/cm | Transparency cm | State of alga growth |
|---|---|---|---|---|---|---|---|
| 1/14–30 | 9 | 11 | 6.8 | 4.5 | 30 | 100 | Algae already grown at this time Length 10–15 mm |
| 1/31 | | Equipment installed | | | | | |
| February | 11.0 | 12.0 | 7.0 | 4.5 | 30 | 95 | |
| March | 16.0 | 15 | 7.3 | 4.9 | 33 | 60 | Most active period of algae 30–100 mm |
| April | 19.0 | 20 | 7.4 | 5.6 | 35 | 35 | Algae started to be cut short (alga removal) |
| May | 25.0 | 23 | 7.5 | 6.2 | 37 | 70 | Removal of algae expanded all over 2–3 mm |
| June | 27 | 24 | 7.6 | 6.5 | 32 | 85 | Length of algae 1–2 mm |
| July | 32 | 28 | 8.0 | 7.0 | 35 | 65 | Removal of algae almost completed |
| August | 34 | 30 | 8.1 | 6.2 | 36 | 47.5 | Removal of algae almost completed |
| September | 29 | 23.3 | 8.1 | 8.4 | 36 | 80 | Removal of algae almost completed |

(4) Examples on Metal Catalysts
  a) Example 1—Nickel Catalyst

Among various solid catalysts, nickel catalysts are most widely used due to their excellent properties. They are mainly used for hydrogenation, dehydrogenation, reductive desulfurization, reductive alkylation, reductive amination and redox reactions. Prepared in the instant examples was a nickel catalyst supported on a tourmaline carrier by deposition of Ni ions contained in an aqueous solution of a nickel salt on the cathodic electrode of tourmaline crystals present on the surface of pellets containing the tourmaline crystals. The nickel salt used was nickel nitrate $Ni(NO_3)_2 \cdot 6H_2O$.

One (1) g of this nickel salt was dissolved in 1000 cc of water to prepare an aqueous solution containing 1000 ppm of Ni, which was placed in a glass flask with 200 g of 3.5 mm diameter pellets containing tourmaline. These were well stirred together at 150 rpm with a desktop type stirrer, whose blade was located at a position where it did not touch the pellets. Pellets were removed after ten (10) minute, 20 minute, 40 minute and 120 minute intervals of stirring, well washed with water, dried with warm air of 60° C., and airtightly sealed in containers for storage. The quantities of Ni contained in the obtained four groups of pellets were analyzed and determined in a conventional manner.

The results are set out below.

TABLE 9

| Quantities of Ni Deposited per 1 kg Pellets | |
|---|---|
| Time in minutes | Quantity in mg/kg |
| 10 | 170 |
| 20 | 212 |
| 40 | 280 |
| 120 | 420 |

Figure 4:
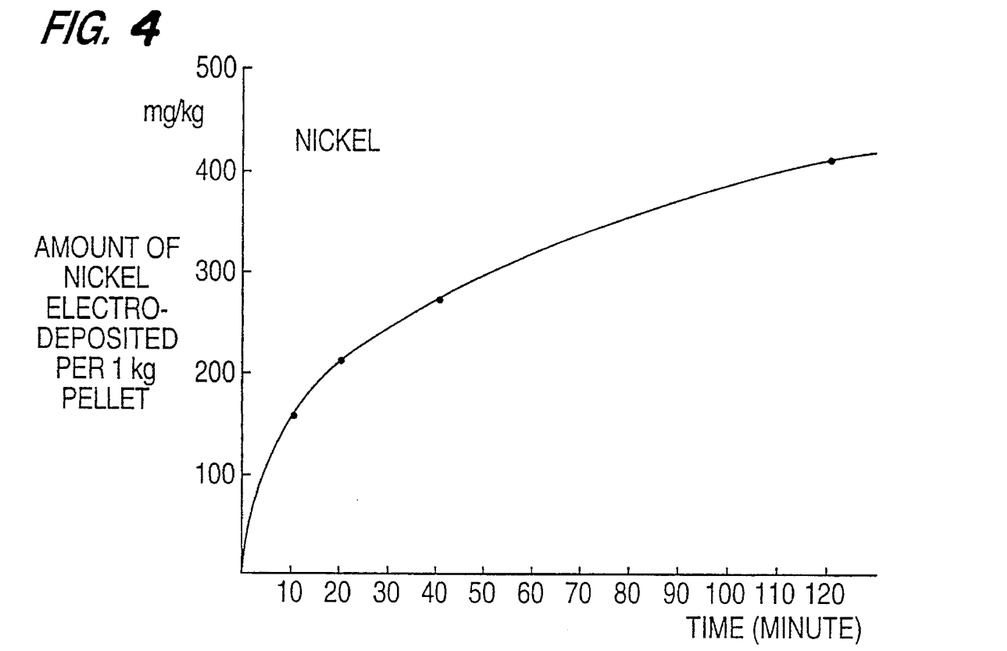
FIG. 4 graphically represents the amount of nickel deposited per 1 kg of tourmaline-containing pellets.

FIG. 4 is a graphic representation of Table 9, from which it is understood that the quantity of Ni deposited is saturated at a constant value. The production time, for instance, may be reduced by controlling the silver ion concentration and temperature of the aqueous solution and adding additives known in the silver plating art.

The tourmaline pellet composition used for supporting nickel had the following composition.

| Composition | |
|---|---|
| Activated Alumina (Arcore Co., Ltd.) | 40% |
| Borosilicate Glass (Asahi Glass Co., Ltd.) | 40% |
| Tourmaline (from Brazil) | 10% |
| Plastisizer | 10% |
| Sintering Temperature 900° C. | 2 hours |

The surface of each pellet was formed of $Al_2O_3$ (crystalline), $SiO_2$ (amorphous) and tourmaline crystals belonging to a silicate mineral, all finely divided to 3μ or less. In order to prepare nickel catalysts, it has so far been required that a solution of a nickel salt such as nickel nitrate be treated with a reducing agent to convert it into a hydroxide, oxide or carbonate and added with a precipitating agent to remove impurities other than nickel, esp. S, AS and P which are catalyst poisons, by a stringent operation. Among nickel catalysts on carriers available so far, there are those supported on diatomaceous earth, pumice and alumina. However, needed for all these catalysts are complicated and stringent steps of calcination, pulverization, drying, sorting and purification and an additional reduction step which is carried out by heating at 300° to 500° C. for several hours in hydrogen.

As will be understood from Example 1, the present invention enables Ni of high purity to be supported on the carrier by a very simple operation, because only the Ni ions in the aqueous solution are selectively adsorbed on the surface of the cathode end of the tourmaline crystals. In addition, virtually all catalyst poison substances are not deposited on the electrode.

b) Example 2—Platinum Catalyst

Platinum belongs to a group of catalysts which have been used for a long time. With platinum catalysts, oxides can be easily reduced at room temperature in a hydrogen stream. The platinum catalysts show hydrogenation activity under gentle conditions, and are particularly effective for hydrogenation of functional groups or benzene nuclei. However, they are expensive and their activities drop due to sintering at high temperature. Thus, they are often used while deposited on carriers. Prepared in the instant example was a platinum catalyst supported on a tourmaline carrier.

The platinum salt used was hexachloroplatinic (IV) acid, $H_2PtCl_6$. This platinum salt was dissolved in 1000 cc of water to make an aqueous solution containing 1000 ppm of Pt, to which 200 g of the same tourmaline pellets used in Example 1 were added for immersion. With the same equipment and procedure as in Example 1, the aqueous solution was stirred. Pellets were removed after ten (10) minute, 20 minute, 40 minute and 120 minute intervals of stirring, and the pellets were washed with water and dried. The quantities of Pt contained in the thus obtained four groups of pellets were analyzed and determined in a conventional manner.

The results are set out below.

TABLE 10

| Quantities of Pt Deposited per 1 kg Pellets | |
|---|---|
| Time in Minutes | Quantity in mg/kg |
| 10 | 76 |
| 20 | 142 |
| 40 | 260 |
| 120 | 476 |

Figure 5:
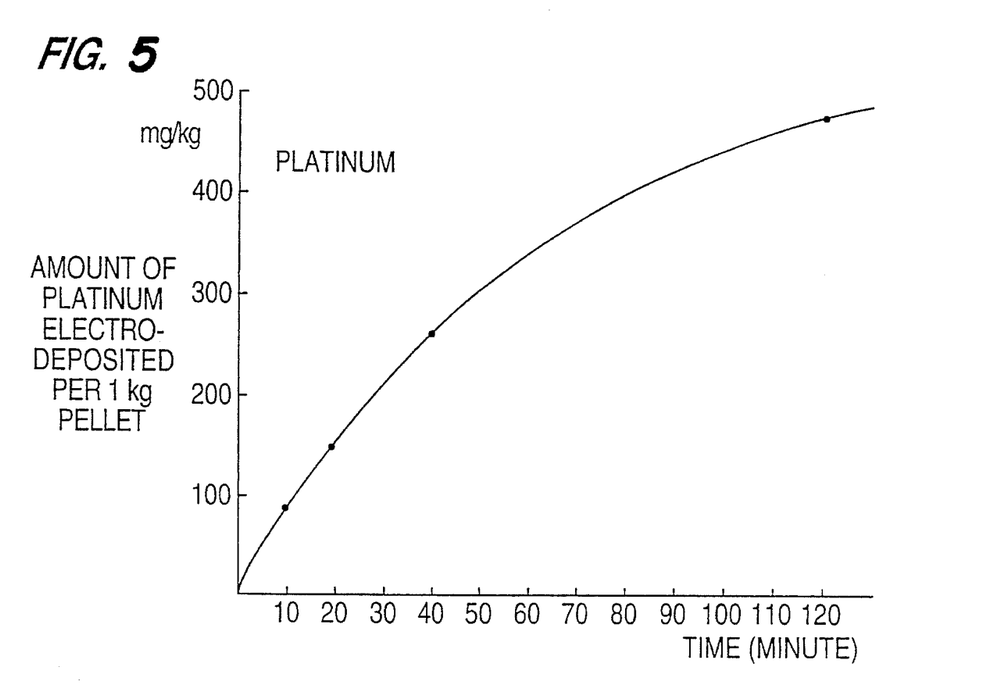
FIG. 5 is graphically represents the amount of platinum deposited per 1 kg of tourmaline-containing pellets.

FIG. 5 is a graphic representation of Table 10, from which it is understood that the quantity of Pt deposited is saturated with the lapse of time; that is, there is a similar tendency as found in Example 1. For comparison, reference is made to a conventional process, according to which hexachloroplatinic (IV) acid is dissolved in water and impregnated in a suitable carrier, which is then dried and reduced with hydrogen or other reducing agent.

As will be noted from the comparison with the conventional process, the use of tourmaline crystals as a carrier enables the Pt ions in the aqueous solution to be selectively deposited on the surface of the cathode of tourmaline crystals as metal atoms. This itself is tantamount to reduction and shows high selectivity as well. Thus, it is unnecessary to use any special reducing agent.

c) Example 3—Testing for verifying that tourmaline crystals can serve as permanent electrodes Test 1

Eight hundred (800) cc of water (which may be normal tap water) was filled with about 200 to 300 g of tourmaline pellets in a narrow-necked bottle of about 600 to 1,000 cc in volume, and a cork stopper was then plugged into the neck with a space of about 20 mm between the cork and the solution surface. This cork stopper had a hole of about 3 mm in diameter. This bottle was gently shaked for about 10 to 20 seconds to remove air bubbles deposited on the surface of the pellets. Then, a Kitagawa type detection pipe (for detecting hydrogen) was inserted into the hole in the cork.

The bottle was allowed to stand overnight. In the morning, the detection pipe turned from yellow to purple. This indicates that a gas having the pressure required to allow it to pass through the portion filled with the detecting agent was generated and that the gas was hydrogen.

Test 2

Eight hundred (800) cc of an aqueous solution of hydrochloric acid (adjusted to pH 3) was filled in a 1-liter glass beaker. With a stirrer having a turbine blade located about 3 cm below the solution surface, the aqueous solution was then stirred at 150 rpm together with about 150 to 200 g of tourmaline pellets. The pH and specific conductivity of the solution were measured with the lapse of time. The specific conductivity decreased from an initial value of 100 done to about 60 after 20 minutes. The pH increase was due to the fact that [$H^+$] was lost on the cathode and the specific conductivity decrease was due to the fact that $H^+$ ions decreased in the solution. These results indicate that electrolysis of water took place at a voltage lower than the electrolytic voltage of water.

Test 3

An aqueous solution of silver nitrate and copper sulfate was prepared. Tourmaline pellets containing 10% tourmaline crystals were added to the solution in an amount of 20% by weight per 100% weight of the solution and well stirred in the solution. One to two hours later, the metals of silver and copper were deposited on the cathode electrodes on the surfaces of the tourmaline pellets. This is the same phenomenon as found in plating. After the pellets had been well washed, the quantities of silver and copper deposited were determined. Silver and copper were found to be deposited in an amount of 700 to 800 mg per 1 kg of pellets. This indicates that tourmaline has a permanent electrode.

CONCLUSION

Effect Of The Invention

A method of depositing an ionic material using tourmaline crystal and tourmaline crystals with the deposited metal according to the present invention enable removing metallic ions from a liquid such as water with ease or supplying metallic ions instead with structures set forth above, making it possible to utilize them for various applications.

Particularly, in addition to the effect of water interfacial activation produced by the tourmaline itself, the effect utilization of metals such as copper, silver, etc. for algae extinction and the pasteurizing effect, the removal of harmful heavy metals and others according to the present invention are greatly contributive to the environmental purification which has presented problems at present.

Also, with this invention, it is possible to easily control the removal and supply of metallic ions.

The metal catalysts carried on tourmaline carriers obtained by the process according to this invention have a number of merits. In particular, the expensive deposited metals have surface areas so large that their amounts can be reduced and are stable to heat as well.

Accordingly to this invention, not only can metal catalysts be simply carried on tourmaline carriers, but the metal catalysts can also be very firmly deposited on the carriers due to deposited occurring on the electrode surfaces of the carriers, so that they can stand up to high temperatures about (950° C. or lower). The tourmaline carriers of this invention may be used as carriers for nearly all metal catalysts developed so far in the art. Thus, this invention makes a great contribution to virtually all industries and aspects of life.

In addition, waste plating solutions may be used as the aqueous solution of metal salts used for deposition of metals on the tourmaline carriers. Thus, waste plating or other metal-treating solutions may be recycled.

What is claimed is:

1. A metal catalyst carried on a carrier material, wherein said carrier material comprises a fine tourmaline crystal possessing polarity and wherein said metal catalyst is deposited on a pole of said crystal.

2. A metal catalyst carried on a carrier material, wherein said carrier material comprises a formed body containing a plurality of fine tourmaline crystals possessing polarity and wherein said metal catalyst is deposited on poles of said crystals which are exposed on a surface of said formed body.

3. A metal catalyst carried on a carrier material, which is prepared by:

immersing the carrier material in an aqueous solution of at least one metal ion, said carrier material being selected from the group consisting of a powder of fine tourmaline crystals possessing polarity and a formed body containing a plurality of fine tourmaline crystals possessing polarity, mixing and stirring the aqueous solution until said at least one metal ion is deposited on poles of said tourmaline crystals of said carrier material, separating said carrier material from the aqueous solution, evaporating off traces of the aqueous solution from said carrier material, and drying said carrier material to obtain the metal catalyst carried on the carrier material.

4. The metal catalyst carried on a carrier material according to claim 3, wherein the aqueous solution contains two or more metal ions, and wherein the metals ions are deposited on said carrier material in an inverse proportion to the magnitude of a deposition ionization tendency of the metal ions.

5. The metal catalyst carried on a carrier material according to claim 3, wherein during the drying of said carrier material, said carrier material is further solidified in a pellet, honeycomb, film, sheet or fiber form.

6. The metal catalyst carried on a carrier material according to claim 3, wherein the aqueous solution contains two or more metal ions, wherein the metal ions are deposited on said carrier material in an inverse proportion to the magnitude of a deposition ionization tendency of the metal ions, and wherein during the drying of said carrier material, said carrier material is further solidified in a pellet, honeycomb, film, sheet or fiber form.

7. A process for preparing a metal catalyst carried on a carrier material, which comprises the steps of:

immersing the carrier material in an aqueous solution of at least one metal ion, said carrier material being selected from the group consisting of a powder of fine tourmaline crystals possessing polarity and a formed body containing a plurality of fine tourmaline crystals possessing polarity, mixing and stirring the aqueous solution until said at least one metal ion is deposited on poles of said tourmaline crystals of said carrier material, separating said carrier material from the aqueous solution, evaporating off traces of the aqueous solution from said carrier material, and drying said carrier material to obtain the metal catalyst carried on the carrier material.

8. The process for preparing a metal catalyst carried on a carrier material according to claim 7, wherein the aqueous solution contains two or more metal ions, and wherein the metals are deposited on said carrier material in an inverse proportion to the magnitude of a deposition ionization tendency of the metal ions.

9. The process for preparing a metal catalyst carried on a carrier material according to claim 7, wherein during the drying of said carrier material, said carrier material is further solidified in a pellet, honeycomb, film, sheet or fiber form.

10. The process for preparing a metal catalyst carried on a carrier material according to claim 7, wherein the aqueous solution contains two or more metal ions, wherein the metals are deposited on said carrier material in an inverse proportion to the magnitude of a deposition ionization tendency of the metal ions, and wherein during the drying of said carrier material, said carrier material is further solidified in a pellet, honeycomb, film, sheet or fiber form.

11. The metal catalyst according to any one of claims 1–6, wherein the fine tourmaline crystals are between 1–5 microns in average size.

12. The metal catalyst according to any one of claims 2–6, wherein the formed body comprises 1–15% of iron tourmaline crystals, 30–50% of alumina, 30–50% of borosilicate glass and 7–15% of a clay molding aid, by weight.

13. The metal catalyst according to any one of claims 1–6, wherein the metal ion is selected from the group consisting of ion of Fe, Ni, Pd, Pt, Ag, Co, W, Re, Ge and Ir.

14. The process according to any one of claims 7–10, wherein the fine tourmaline crystals are between 1–5 microns in average size.

15. The process according to any one of claims 7–10, wherein the formed body comprises 1–15% of iron tourmaline crystals, 30–50% of alumina, 30–50% of borosilicate glass and 7–15% of a clay type molding aid, by weight.

16. The process according to any one of claims 7–10, wherein the metal ion is selected from the group consisting of ion of Fe, Ni, Pd, Pt, Ag, Co, W, Re, Ge and Ir.

* * * * *